United States Patent [19]
Schmitt

[11] Patent Number: 5,746,000
[45] Date of Patent: May 5, 1998

[54] HEADLAMP ASSEMBLY WITH MAGNETIC INDICATOR FOR HORIZONTAL AND VERTICAL POSITIONING

[75] Inventor: Karl R. Schmitt, Rockford, Ill.

[73] Assignee: Textron Inc., Providence, R.I.

[21] Appl. No.: 689,798

[22] Filed: Aug. 14, 1996

[51] Int. Cl.⁶ .................................................. G01B 5/25
[52] U.S. Cl. ..................... 33/288; 33/335; 33/DIG. 1; 33/533; 33/645
[58] Field of Search ...................... 33/288, 300, 333, 33/335, 354, 370, DIG. 1, 391, 402, 600, 645, 533; 362/61, 419

[56] References Cited

U.S. PATENT DOCUMENTS

| | | | |
|---|---|---|---|
| 4,571,844 | 2/1986 | Komasaku et al. | 33/391 |
| 5,140,503 | 8/1992 | Lisak | 33/288 |
| 5,479,714 | 1/1996 | Hopkins | 33/335 |
| 5,586,393 | 12/1996 | Pherigo et al. | 33/288 |

*Primary Examiner*—Christopher W. Fulton
*Attorney, Agent, or Firm*—Trexler, Bushnell, Giangiangiorgi & Blackstone,Ltd.

[57] ABSTRACT

A headlamp position indicator device is used to denote the proper aiming position of a headlamp in an adjustable headlamp assembly. The headlamp assembly includes a housing, a movable component adjustably retained in the housing, and adjustor mechanisms for aiming the movable component. The headlamp position indicator device of the present invention includes a magnet mounted on the movable component and an assembly mounted on the housing. The assembly includes a holder having a cover member mounted thereon and a position indicator mounted therebetween. The cover member has a plurality of indicia thereon. The position indicator may be a ferrous ball bearing or a pointer member. The position indicator is magnetically attracted to the magnet and moveable relative to the housing according to the position of the magnet. Once the headlamp is zeroed, a zero indicia on the cover member is moved so as to be proximate to the position indicator. Thereafter, if the headlamp becomes misaligned, the headlamp adjustor mechanisms are used to move the headlamp back to its zero position which will be indicated when the position indicator re-aligns with the zero indicia.

16 Claims, 3 Drawing Sheets

HEADLAMP ASSEMBLY WITH MAGNETIC INDICATOR FOR HORIZONTAL AND VERTICAL POSITIONING

BACKGROUND OF THE INVENTION

This invention is generally directed to a novel magnetic headlamp position indicator device for visually indicating to an operator when a headlamp in a headlamp assembly on an automobile or the like is in its correct aiming position, commonly referred to as its "zero" position. More specifically, the adjustor mechanism for the headlamp is operated to achieve proper aim of the headlamp. Thereafter, the magnetic indicator device is operated to a "zero position", as such, if the headlamp should vibrate out of position or move for any other reason, the magnetic indicator device provides an indication of this fact and by adjusting the headlamp until the magnetic indicator device returns to the zero position, will properly reposition the headlamp in its desired orientation.

A variety of devices are commonly used to indicate to an operator or vehicle mechanic when a headlamp is in its zero position. Such a device may be provided as part of the headlamp adjustor mechanism which is used to adjust the aiming of the movable component in the headlamp assembly. These types of devices are often difficult to view or to calibrate. Other such devices are provided as separate components from the headlamp adjustor mechanism and are instead mounted directly on the movable reflector component itself to indicate to a vehicle mechanic the zero position of the movable reflector component. These devices are viewed through an opening or clear plastic window which is provided in the housing surrounding the reflector component. A problem that occurs with the use of a window is that it can leak which can cause damage to the electronic components housed in the housing.

Following assembly of an automobile, the headlamps must be set to their desired or zero position. This is generally accomplished by use of sophisticated photometric metering equipment and manually adjusting the headlamps until the headlamps point in the desired location by using the adjustor mechanisms. Adjustor mechanisms for adjusting the aiming of a reflector component to a desired location are well-known in the art.

Due to vibration or an accident, the headlamps may move out of the desired aiming location. With certain prior art headlamp assemblies, there is no easy way to attain the desired initial position or alignment without use of specialized equipment. With the novel headlamp magnetic position indicator device of the present invention, the zero position of the movable reflector component is indicated and the vehicle mechanic need only adjust the position of the reflector component by using the adjustor mechanism to move the reflector component back to its zero position, which will be indicated by the novel magnetic headlamp position indicator device of the present invention. The novel indicator assembly of the present invention does not employ the use of a window nor is it mounted on a hard-to-see adjustor mechanism.

OBJECTS AND SUMMARY OF THE INVENTION

A general object of the present invention is to provide a novel magnetic headlamp position indicator device for visually and accurately indicating to a vehicle mechanic when a movable reflector component in a headlamp assembly is in the "zero" position.

An object of the present invention is to provide a novel magnetic headlamp position indicator device that eliminates the need to provide a window through or viewing opening in the housing surrounding the reflector component and is not mounted on the adjustor mechanism.

Another object of the present invention is to provide a novel magnetic headlamp position indicator device that provides a visual indication of when the movable reflector component has been moved into its zero position after being misaligned, thereby allowing for ease of adjusting the position and for the accurate adjustment of a reflector component to its zero position.

Briefly, and in accordance with the foregoing, the present invention discloses a headlamp position indicator device for denoting the proper aiming position of a headlamp in an adjustable headlamp assembly. The headlamp assembly includes a stationary housing, a movable component adjustably retained in the housing, and horizontal and vertical adjustor mechanisms for horizontally and vertically aiming the movable component to a desired aiming position.

The headlamp position indicator device of the present invention includes a magnet mounted on the movable component and an assembly mounted on the housing. The assembly includes a holder having a cover member mounted thereon and a position indicator mounted therebetween. The cover member has a plurality of indicia thereon. The position indicator may be a ferrous ball bearing or a pointer member. The position indicator is magnetically attracted to the magnet and moveable relative to the housing according to the position of the magnet. Once the headlamp is moved to the desired zero position, the cover member is moved relative to the holder until a zero indicia on the cover member is moved so as to be proximate to the position indicator. The cover member is not thereafter moved. If the headlamp becomes misaligned thereafter, the headlamp adjustor mechanisms are used to move the headlamp back to its zero position which will be indicated when the position indicator re-aligns with the zero indicia on the cover member.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENTS

Figure 1:
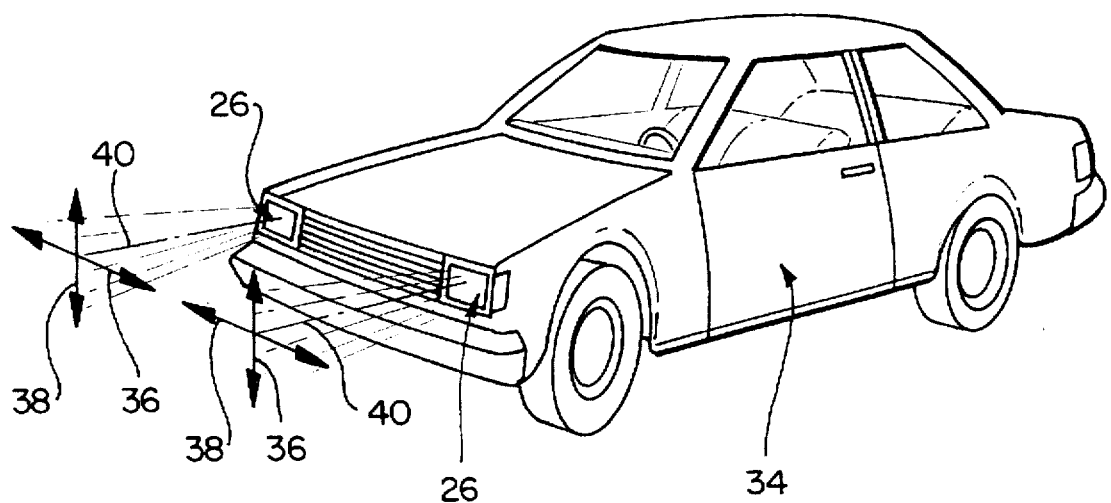
FIG. 1 is a general view of an automobile indicating a vertical and horizontal adjustment of a headlamp assembly.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 2:
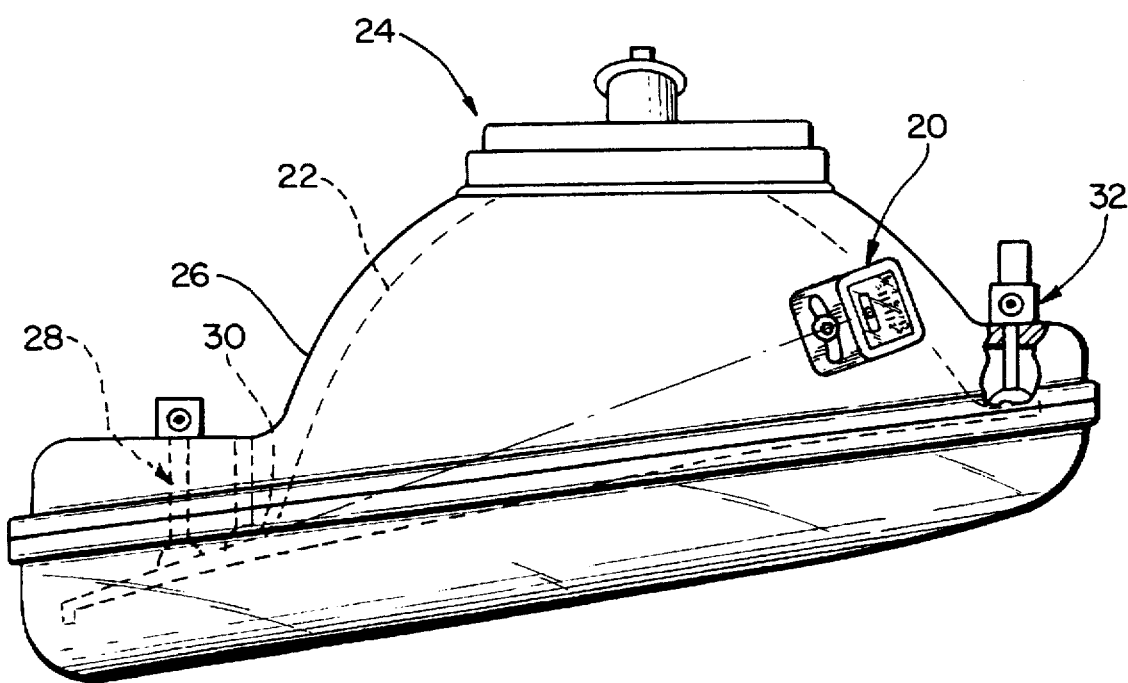
FIG. 2 is a plan view of a headlamp assembly having a magnetic indicator device which incorporates the features of a first embodiment of the invention.
Figure 3:
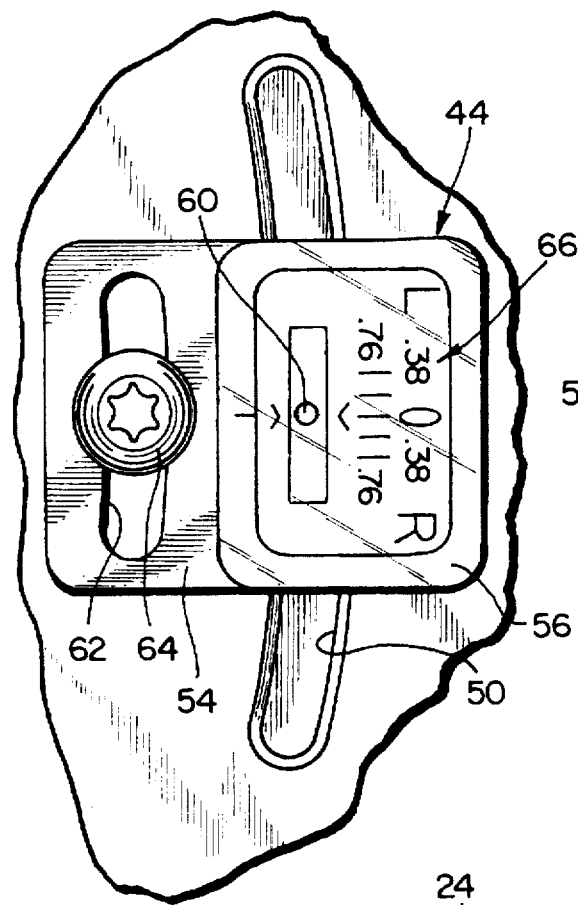
FIG. 3 is an enlarged plan view of the magnetic indicator device shown in FIG. 2.
Figure 4:
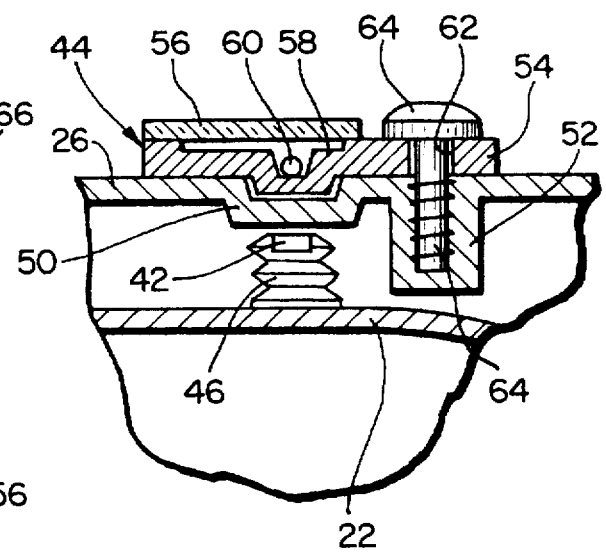
FIG. 4 is a cross-sectional view of the magnetic indicator device of FIG. 2.
Figure 5:
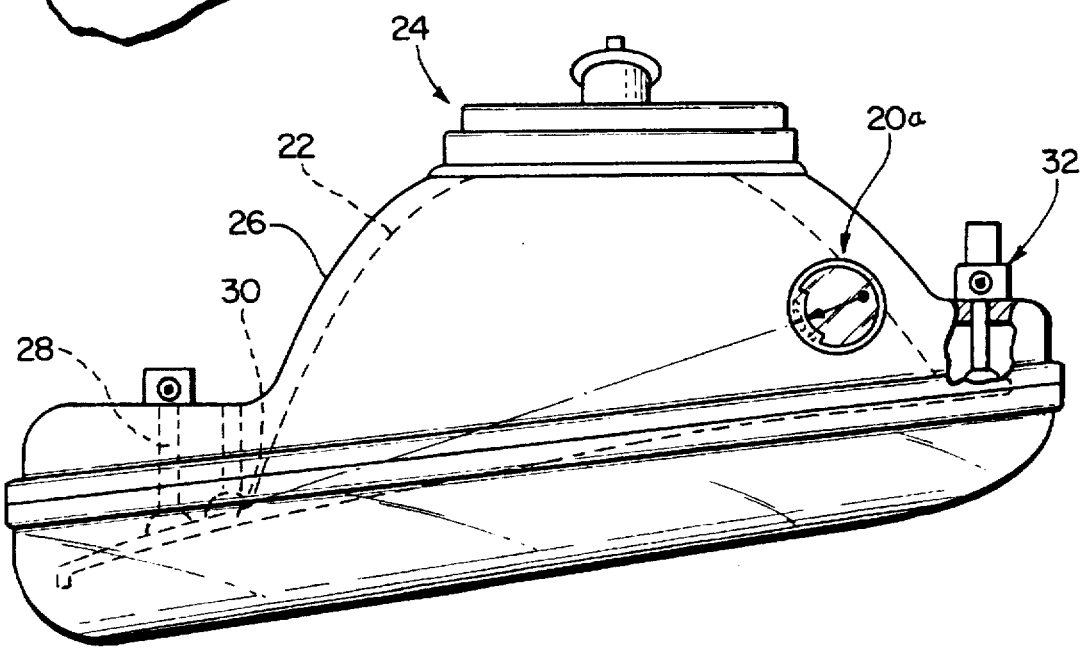
FIG. 5 is a plan view of a headlamp assembly having a magnetic indicator device which incorporates the features of a second embodiment of the invention.
Figure 6:
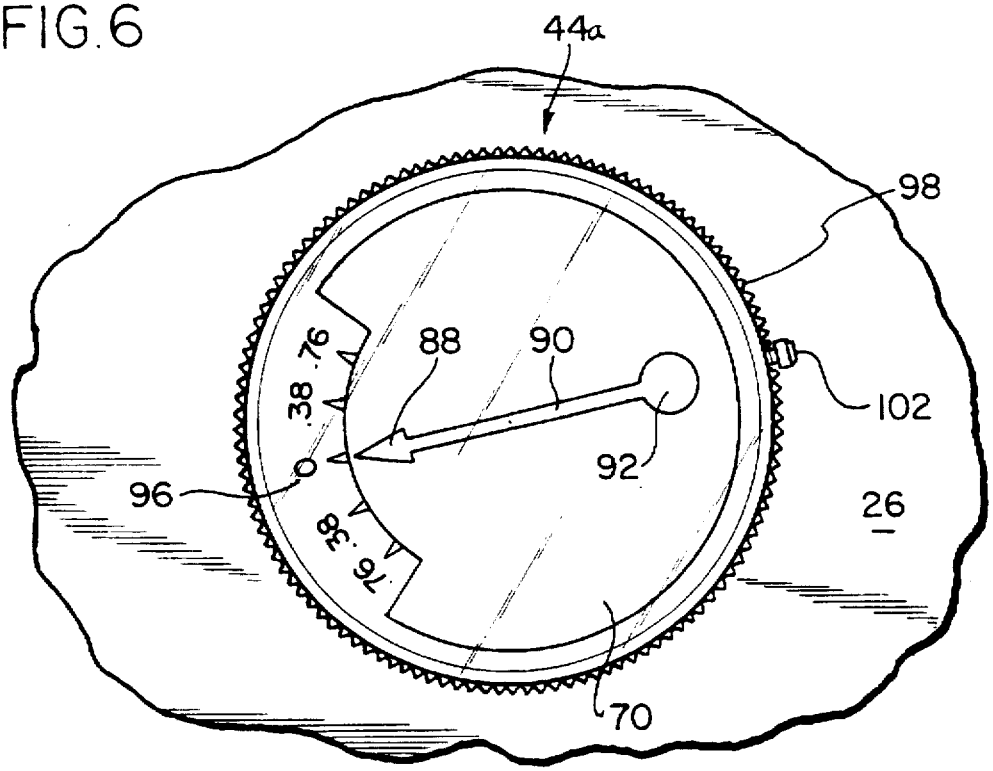
FIG. 6 is an enlarged plan view of the magnetic indicator device shown in FIG. 5.
Figure 7:
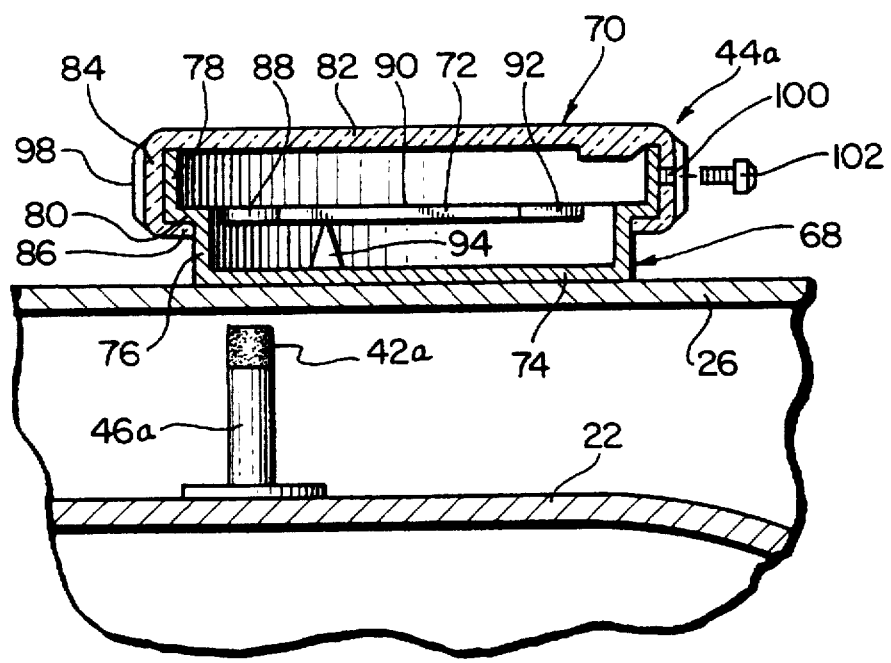
FIG. 7 is a cross-sectional view of the magnetic indicator device of FIG. 5.

The present invention provides a novel magnetic headlamp position indicator device 20, 20a for denoting the proper aiming or "zero position" of a movable reflector component 22 in a headlamp assembly 24 so that a vehicle mechanic can easily return the reflector component 22 to the zero position. A first embodiment of the position indicator device 20 is shown in FIGS. 2–4. A second embodiment of the position indicator device 20 is shown in FIGS. 5–7.

FIG. 1 shows a general view of an automobile 34 which uses the headlamp assembly 24 which can be adjusted in a vertical direction, as indicated by arrows 36, and in a horizontal direction, as indicated by arrows 38, relative to a central axis 40. As best shown in FIGS. 2 and 5, the headlamp assembly 24 includes a stationary component or housing 26 which houses the movable reflector component 22 therein. The reflector component 22 houses a bulb therein and is fabricated from a non-magnetic thermal setting material which has a hardness that is close to ceramic materials. The movable reflector component 22 can pivot in the vertical plane relative to the housing 26 by means of a headlamp adjustor mechanism 28 which pivots the reflector component 22 around a fixed pivot 30 mounted on the housing 26 and engages a socket provided on the reflector component 22. A like adjustor mechanism 32 is employed to move or pivot the reflector component 22 in the horizontal direction around the pivot 30. Headlamp adjustor mechanisms are well-known in the art and a variety of mechanisms can be used with the present invention.

Each embodiment of the headlamp position indicator device 20, 20a of the present invention is provided with a magnet 42, 42a attached to a wall of the reflector component 22 and an assembly 44, 44a mounted on the exterior of the housing 26. The magnet 42, 42a cannot be seen from the exterior of the headlamp assembly 24. The magnet 42, 42a is mounted on a tip of a flexible member 46, 46a, such as a spring, a sponge or other elastomeric type of pedestal, which is mounted on the moveable reflector component 22 such that the magnet 42, 42a is kept in close proximity to the bottom surface of the housing 26 as shown in FIGS. 4 and 7. The magnet 42, 42a may be in the form of a plastic tape, or bar cylinder, sphere, cube or the like. The flexible member 46, 46a is affixed to the reflector component 22 by mounting locators or by adhesion and allows the magnet 42, 42a to stay in close proximity to the housing 26, and providing flexibility in case, during subsequent adjustments of the moveable component 22 with one of the adjustor mechanisms 28, 32, the magnet 42, 42a actually contacts the lower surface of the housing 26. The magnet 42, 42a, flexible member 46, 46a and the assembly 44, 44a are mounted on reflector component 22 and housing 26, respectively, at a predetermined distance away from the pivot 30 on the arc along which the reflector 22 pivots.

The headlamp position indicator device 20, 20a of the present invention can be used to indicate a vertical positioning or a horizontal positioning. To indicate vertical positioning, the headlamp position indicator device 20 is mounted on the rear wall of the headlamp housing 26 and the rear wall of the reflector component 22. To indicate horizontal positioning, the headlamp position indicator device 20, 20a is mounted on the top wall of the headlamp housing 26 and the top wall of the reflector component 22.

Attention is now directed to the specifics of the first embodiment of the magnetic indicator device 20 shown in FIGS. 2–4.

An arcuate guide or track 50 is provided in the wall of the headlamp housing 22 and is positioned directly over the magnet 42 mounted on the moveable reflector component 22. The track 50 is positioned at a predetermined radius away from the fixed pivot 30. This radius will vary according to the different headlamp geometries on which the indicator device 20 of the present invention is used, however, the further away from the fixed pivot 30, the more movement by the reflector component 22 is indicated on the position indicator device 20. In addition, a boss 52 is provided in the wall of the housing 22 and is spaced from the arcuate track 50 and generally aligns with the center of the arcuate track 50.

The assembly 44 includes a plastic holder or base plate 54 and a clear plastic retention cover 56. The base plate 54 is seated on the wall of the housing 22. The base plate 54 and the retention cover 56 are secured to each by suitable means, such as by mount or by adhesive.

The base plate 54 has an arcuate guide 58 which protrudes downwardly from the remainder of the base plate 54. The arc radius of the arcuate guide 58 corresponds to the arc radius of the arcuate track 50 formed on the wall of the housing 26, but the arcuate guide 58 has a length that is less than the length of the arcuate track 50. A ferrous ball bearing 60 is seated within the guide 58 and is retained between the base plate 54 and the retention cover 56. The base plate 54 also has an arcuate clearance slot 62 provided therethrough which is spaced from the arcuate guide 58. The arc radius of the arcuate clearance slot 62 corresponds to the arc radius of the arcuate track 50 formed on the wall of the housing 26, but the arcuate clearance slot 62 has a length that is less than the length of the arcuate track 50. When the assembly 44 is placed on the wall of the housing 22, the guide 58 is seated in the housing track 50 and the clearance slot 62 is aligned with the boss 52 formed in the wall of the housing 26. A set screw 64 is engaged through the aligned arcuate clearance slot 62 and the boss 50, but initially, is not tightened down onto the base plate 54 for reasons described herein.

The retention cover 56 has an indicia print pad 66 thereon proximate to the position of the arcuate guide 58 which can be seen through the clear plastic material of the retention cover 56. The print pad 66 includes a plurality of markings which indicate a zero position and variance from the zero position. The marking which indicates the zero position is at the center of the arcuate guide 58 in the base plate 54.

Now that the specifics of the first embodiment of the headlamp position indicator device 20 have been described in detail, the method of using the headlamp position indicator device 20 will be described.

Following assembly of the automobile 34 to which the headlamp position indicator device 20 of the present invention is attached as described herein, each movable reflector component 22 is set to their desired or "zero" position by using photometric metering equipment or the like and manually moving the movable reflector component 22 until the reflector beams point in the desired location by using the adjustor mechanisms 28, 32. The ferrous ball bearing 60 moves or rolls along the arcuate guide 58 as the moveable reflector component 22 is being moved because the position of the magnet 42 moves with the reflector component 22 (as the magnet 42 is mounted thereon), and the ferrous ball bearing 60 is magnetically attracted to the magnet 42. The housing 22 and the reflector component 22 are each made of a non-magnetic material, and therefore does not affect this relationship.

Once the desired zero position is attained, the movable reflector component 22 is not moved again and thus, the ferrous ball bearing 60 maintains its position because of its magnetic attraction to the magnet 42 mounted on the reflector component 22. With the set screw 64 in a non-tightened condition, the base plate 54 is slid relative to the housing 26 such that the arcuate clearance slot 62 slides along the set screw 64, which does not move relative to the housing 26, and the arcuate guide 58 slides along the arcuate track 50 in the housing 26. The arcuate guide 58 moves relative to the ferrous ball bearing 60 which does rot change position when the base plate 54 is slid because of its magnetic attraction to the magnet 42. The base plate 54 is moved until the ball bearing 60 is positioned at the zero marking on the indicia print pad 66. Thereafter, the set screw 62 is tightened against the base plate 54 so that the base plate 54 cannot move relative to the housing 26.

Thus, if the headlamp assembly 24 becomes misaligned for any reason, the headlight can be easily returned to its zero position because the indicator device 20 will indicate this misalignment to the operator because the ball bearing 60 will no longer align with the zero marking on the indicia print pad 66. To re-align the headlamp assembly 24, the reflector component 22 is simply moved by using the appropriate headlamp adjustor mechanism 28, 32, thereby moving the position of the magnet 42 mounted on the reflector component 22, until the ball bearing 60 is moved into re-alignment with the zero marking on the indicia print pad 66. The position of the base plate 54 relative to the housing 26 is not changed during this re-alignment process. Once the ball bearing 60 is re-aligned with the zero indicia on the print pad 66, the headlamp will be returned to its zero position.

Attention is now directed to the specifics of the second embodiment of the position indicating device 20a of the present invention shown in FIGS. 5-7.

The assembly 44a includes a plastic base holder 68 and a clear plastic cover 70 which mounts a pointer member 72 therebetween. The base holder 68 is seated on the wall of the housing 22 at a predetermined radius away from the fixed pivot 30. This radius will vary according to the different headlamp geometries on which the indicator device 20a of the present invention is used, however, the further away from the fixed pivot 30, the more movement by the reflector component 22 is indicated on the position indicator device 20a.

The base holder 68 includes a bottom wall 76 which has a lower annular side wall 76 which extends upwardly therefrom. The lower annular side wall 76 is connected to an upper annular side wall 78 by an intermediate wall 80 which is generally perpendicular to the lower and upper side walls 76, 78 and integrally joins the side walls 76, 78. The upper side wall 78 has a diameter which is greater than the lower side wall 76 such that a shoulder is formed between the upper and intermediate side walls 78, 80. The bottom wall 76 of the holder 68 is mounted on the wall of the housing 26 by suitable means, such as by a mount or by adhesive.

The cover 70 overlays the base holder 68 and is rotatable relative to the base holder 68. The cover 70 includes an upper or face wall 82, an annular skirt wall 84 which depends from the outer margins of the face wall 82 and which overlays the upper side wall 78 of the holder 68, and a lower wall 86 which extends inwardly from the skirt wall 84 and overlays the intermediate wall 80 of the holder 68. Thus, the cover 70 grasps the holder 68 but is rotatable relative thereto.

The pointer member 72, as shown, has an arrow head 88 at one end of a shaft 90 and a bulb 92 at the other end of the shaft 90. The shaft 90 of the pointer member 72 is rotatably mounted on a member 94 which is fixedly mounted on the base wall 74 of the holder 68. The arrow head 88 is made of a metallic material or has a metallic material suitably affixed thereto, preferably iron, and the shaft 90 and bulb 92 are made of a non-metallic material.

The face wall 82 of the cover 70 has an indicia print pad 96 thereon proximate to the position of where the arrow head 88 is located, which can be seen through the clear plastic material of the cover 70. The print pad 96 includes a plurality of markings which indicate a zero position and variance from the zero position.

The skirt wall 84 of the cover 70 includes a plurality of outwardly protruding teeth-like serrations 98 therearound. An operator can easily grasp the cover 70 because of the serrations 98 and turn the cover 70 relative to the holder 68 for reasons described herein. A threaded aperture 100 is provided through the skirt wall 84 and any interfering serrations 98 and accepts a set screw 102 therein for reasons described herein.

Now that the specifics of the second embodiment of the headlamp position indicator device 20a have been described in detail, the method of using the headlamp position indicator device 20a will be described.

Following assembly of the automobile 34 to which the headlamp position indicator device 20a of the present invention is attached as described herein, each movable reflector component 22 is set to their desired or "zero" position by using photometric metering equipment or the like and manually moving the movable reflector component 22 until the reflector beams point in the desired location by using the adjustor mechanisms 28, 32. The pointer member 72 rotates on the member 94 as the moveable reflector component 22 is being moved because the position of the magnet 42a moves with the reflector component 22 (as the magnet 42a is mounted thereon), and the arrow head 88 of the pointer member 72 is magnetically attracted to the magnet 42a. The housing 22 and the reflector component 22 are each made of a non-magnetic material, and therefore does not affect this relationship.

Once the desired zero position is attained, the movable reflector component 22 is not moved again and thus, the pointer member 72 maintains its position because of its magnetic attraction to the magnet 42a mounted on the reflector component 22. With the set screw 102 in a non-tightened condition, the cover 70 is rotated relative around the holder 68 until the zero marking on the indicia print pad 96 is aligned with the arrow head point. Thereafter, the set screw 102 is tightened against the holder 68 so that the cover 70 cannot move relative to the holder 68. Alternatively, the set screw 102 can be eliminated and the cover 70 and holder 68 maintained in proper relative position by friction.

Thus, if the headlamp assembly 24 becomes misaligned for any reason, the headlight can be easily returned to its zero position because the indicator device 20a will indicate this misalignment to the operator because the arrow head 88 on the pointer member 72 will no longer align with the zero marking on the indicia print pad 96. To re-align the headlamp assembly 24, the reflector component 22 is simply moved by using the appropriate headlamp adjustor mechanisms 28, 32, thereby moving the position of the magnet 42a mounted on the reflector component 22, until the pointer member 72 is moved into re-alignment with the zero marking on the indicia print pad 96. The position of the cover 70 relative to the holder 68 is not changed during this re-alignment process. Once the pointer member 72 is re-aligned with the zero indicia on the print pad 96, the headlamp will be returned to its zero position.

It is envisioned that instead of the arrow head 88 being made of the metallic material, the bulb 92 may be made of the metallic material so as to be attracted to the magnet 42a which would be placed in proximity of the bulb 92. In addition, the arrow head 88 can be mounted such that it points toward or away from the pivot 30 so long as the magnet 42a is positioned in proximity or directly below the arrow head 88. Alternatively, it is envisioned that the magnet 42a may be on the pointer member 72 and an iron locator on the wall of the reflector component 22.

Another alternative for the second embodiment of the position indicator device 20a is that the moveability of the cover 70 relative to the holder 68 can be eliminated such that the cover 70 is fixedly mounted to the holder 68, and instead, a sticker, markings or the like can be placed on the cover 70 to denote the zero position and variance therefrom after the headlamp assembly 24 has been moved to its desired zero position.

While preferred embodiments of the present invention are shown and described, it is envisioned that those skilled in the art may devise various modifications of the present invention without departing from the spirit and scope of the appended claims.

The invention claimed is:

1. A headlamp position indicator device for use with an adjustable headlamp assembly having a housing, a movable component adjustably retained in said housing, structure for aiming said movable component, said headlamp position indicator device comprising: a magnet operatively associated with said movable component; indicia means in the form of indicia operatively associated with said housing; and position indicating means operatively associated with said housing and moveable relative thereto, said position indicating means being magnetically attracted to said magnet and moveable relative to said housing according to the position of said magnet relative to said housing.

2. A headlamp position indicator device as defined in claim 1, wherein said position indicating means comprises a ball member operatively associated with a track provided by said housing.

3. A headlamp position indicator device as defined in claim 2, wherein said track is arcuate.

4. A headlamp position indicator device as defined in claim 2, further including a cover member operatively associated with said housing and covering said ball member, said ball member being moveable relative to said cover member, said cover member having said indicia means thereon.

5. A headlamp position indicator device as defined in claim 4, further including means for adjustably securing the position of said cover member relative to said housing.

6. A headlamp position indicator device as defined in claim 1, wherein said position indicating means comprises a pointer member operatively associated with and moveable relative to said housing.

7. A headlamp position indicator device as defined in claim 6, further including a cover member operatively associated with said housing, said pointer member being moveable relative to said housing, said cover member having said indicia means thereon and being moveable relative to said housing.

8. A headlamp position indicator device as defined in claim 7, further including means for securing the position of said cover member relative to said housing.

9. An adjustable headlamp assembly comprising:

a housing, a movable component adjustably retained in said housing, structure for aiming said movable component, and a headlamp position indicator device comprising; a magnet mounted on said movable component; indicia means mounted on said housing; and position indicating means mounted on said housing and moveable relative thereto, said position indicating means being magnetically attracted to said magnet and moveable relative to said housing according to the position of said magnet, said indicia means denoting the position of said position indicating means.

10. An adjustable headlamp assembly as defined in claim 9, wherein said headlamp position indicator device further includes a base plate mounted on said housing and a track provided in said base plate and wherein said position indicating means of said headlamp position indicator device comprises a ball member operatively associated with said track.

11. An adjustable headlamp assembly as defined in claim 10, wherein said track is arcuate.

12. An adjustable headlamp assembly as defined in claim 10, wherein said headlamp position indicator device further includes a cover member attached to said base plate and enclosing said ball member between said base plate and said cover member, said ball member being moveable within said base plate and said cover member, said cover member having said indicia means thereon and being moveable with respect to said base plate.

13. An adjustable headlamp assembly as defined in claim 12, wherein said headlamp position indicator device further includes means for securing the position of said cover member relative to said base plate so as to prevent relative movement between said cover member and said base plate.

14. An adjustable headlamp assembly as defined in claim 9, wherein said position indicating means of said headlamp position indicator device comprises a pointer member operatively mounted on and moveable relative to said housing.

15. An adjustable headlamp assembly as defined in claim 14, said headlamp position indicator device further including a cover member enclosing said pointer member therein, said pointer member being moveable within said cover member, said cover member having said indicia means thereon and being moveable relative to said housing.

16. An adjustable headlamp assembly as defined in claim 15, said headlamp position indicator device further including means for securing the position of said cover member relative to said housing.

* * * * *